United States Patent
Endo

(10) Patent No.: US 6,618,198 B1
(45) Date of Patent: *Sep. 9, 2003

(54) VARIABLE MAGNIFICATION OPTICAL SYSTEM AND OPTICAL APPARATUS HAVING IMAGE STABILIZING FUNCTION

(75) Inventor: Hiroshi Endo, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,764

(22) Filed: Dec. 10, 1998

(30) Foreign Application Priority Data

Dec. 15, 1997 (JP) .............................. 9-363193

(51) Int. Cl.⁷ .......................... G02B 27/64; G02B 15/14
(52) U.S. Cl. ..................... 359/557; 359/554; 359/676; 359/686
(58) Field of Search ................................ 359/554–557, 359/676–683, 686, 754, 771, 781; 396/52–55; 348/208

(56) References Cited

U.S. PATENT DOCUMENTS

| | | | | |
|---|---|---|---|---|
| 4,516,839 A | * | 5/1985 | Tokumaru ..................... | 359/686 |
| 4,653,873 A | * | 3/1987 | Kawamura ..................... | 359/686 |
| 4,852,984 A | | 8/1989 | Takahashi et al. | |
| 4,896,950 A | | 1/1990 | Endo et al. | |
| 5,000,550 A | | 3/1991 | Takahashi et al. | |
| 5,042,927 A | | 8/1991 | Ogawa et al. .............. | 359/683 |
| 5,144,488 A | | 9/1992 | Endo et al. ................. | 359/686 |
| 5,189,557 A | | 2/1993 | Endo ............................. | 359/683 |
| 5,241,421 A | | 8/1993 | Endo et al. ................. | 359/684 |
| 5,559,635 A | * | 9/1996 | Sato ............................. | 359/557 |
| 5,576,890 A | * | 11/1996 | Tanaka et al. .............. | 359/686 |
| 5,585,966 A | * | 12/1996 | Suzuki ......................... | 359/557 |
| 5,585,969 A | | 12/1996 | Endo ............................. | 359/683 |
| 5,585,970 A | * | 12/1996 | Shibayama .................. | 359/686 |
| 5,710,669 A | | 1/1998 | Endo ............................. | 359/686 |
| 5,835,272 A | * | 11/1998 | Kodama ....................... | 359/557 |
| 6,320,698 B1 | | 11/2001 | Suzuki ......................... | 359/557 |

FOREIGN PATENT DOCUMENTS

| | | |
|---|---|---|
| JP | 5-232410 | 9/1993 |
| JP | 7-152002 | 6/1995 |
| JP | 7-199124 | 8/1995 |

* cited by examiner

*Primary Examiner*—Thong Nguyen
(74) *Attorney, Agent, or Firm*—Fitzpatrick, Cella, Harper & Scinto

(57) ABSTRACT

A variable magnification optical system having an image stabilizing function includes, in order from an object side, a first lens unit of negative refractive power, a second lens unit of positive refractive power, a third lens unit of negative refractive power and a fourth lens unit of positive refractive power, wherein the separation between every successive two of the first to fourth lens units is varied to effect variation of magnification, and the third lens unit is so moved as to have directional components perpendicular to an optical axis to compensate for shaking of an image caused by vibration of the variable magnification optical system, the variable magnification optical system satisfying the following conditions:

$D1W > D1T$ $D2W < D2T$ $D3W > D3T$ $1.5 < |f3|/f2 < 2.5$ $2.1 < f4/f2 < 10$ where DiW and DiT are separations between the i-th lens unit and the (i+1)st lens unit at a wide-angle end and at a telephoto end, respectively, and fi is a focal length of the i-th lens unit.

7 Claims, 13 Drawing Sheets

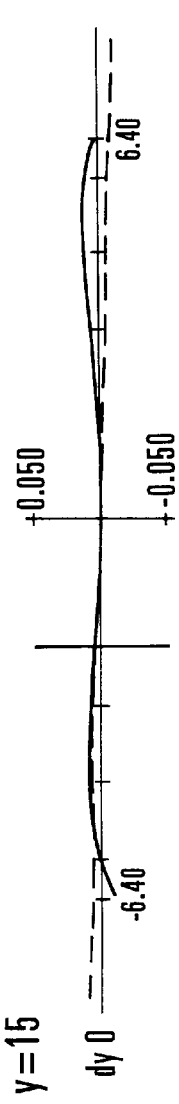
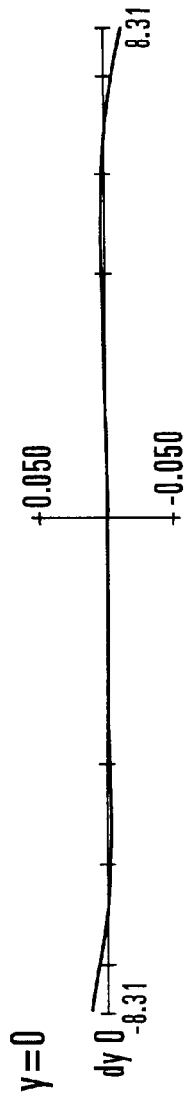
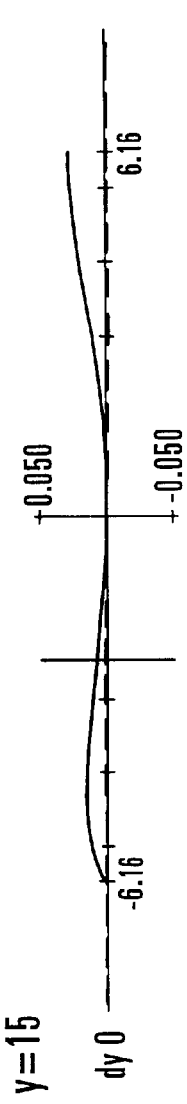
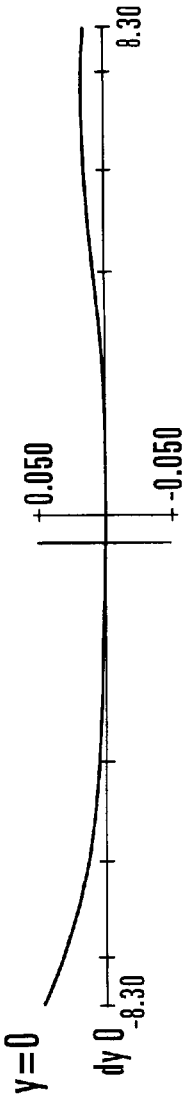
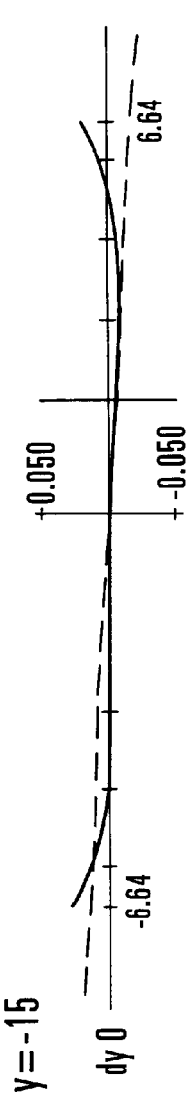
FIG. 5A1  FIG. 5A2  FIG. 5B1  FIG. 5B2  FIG. 5B3

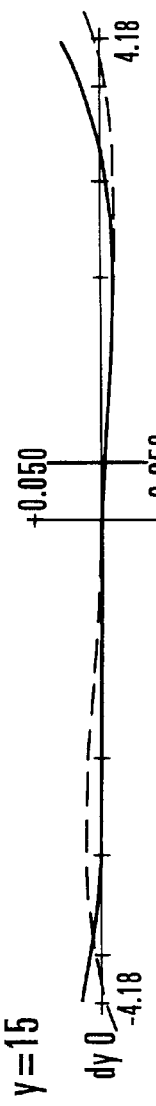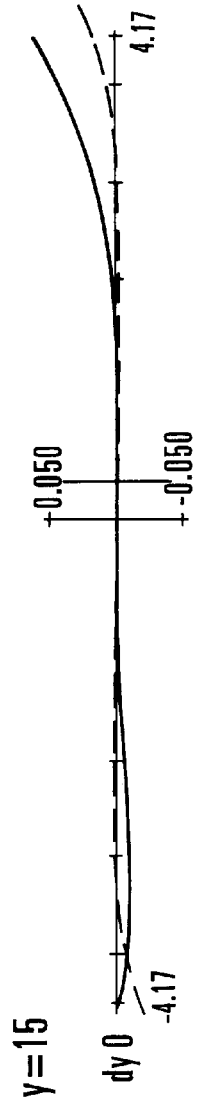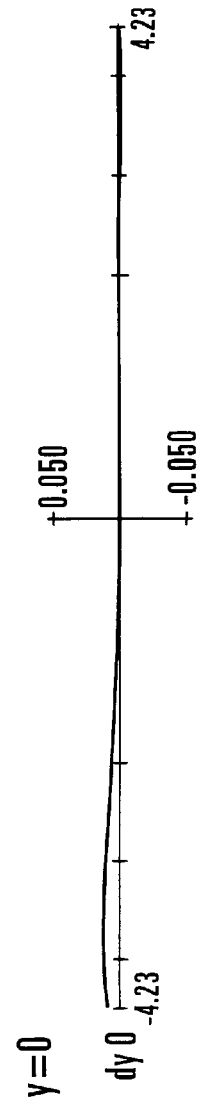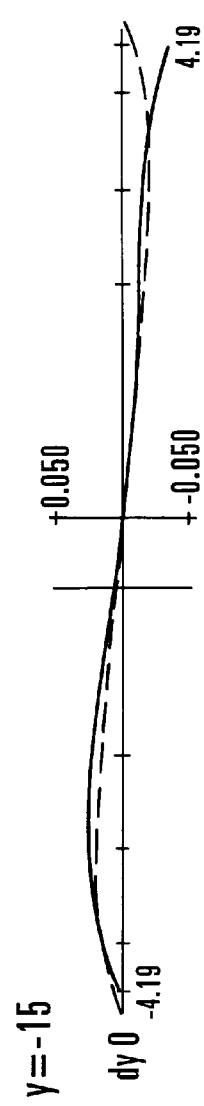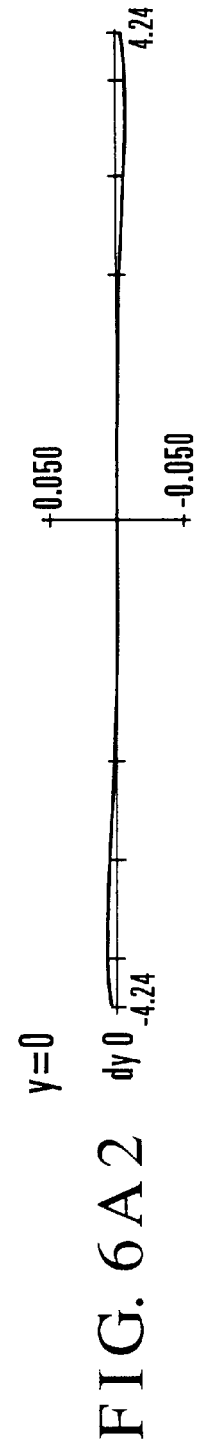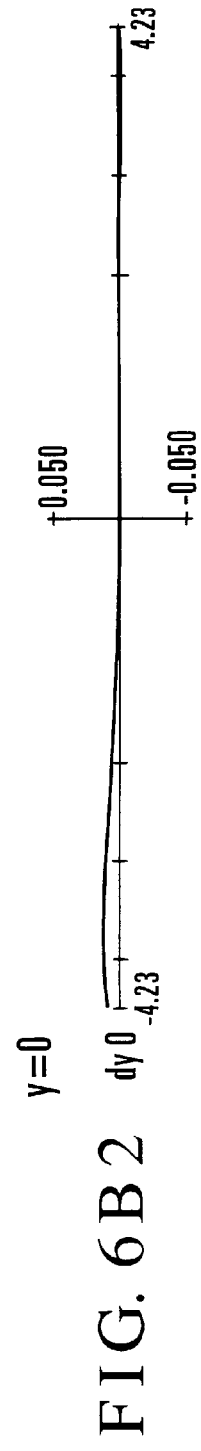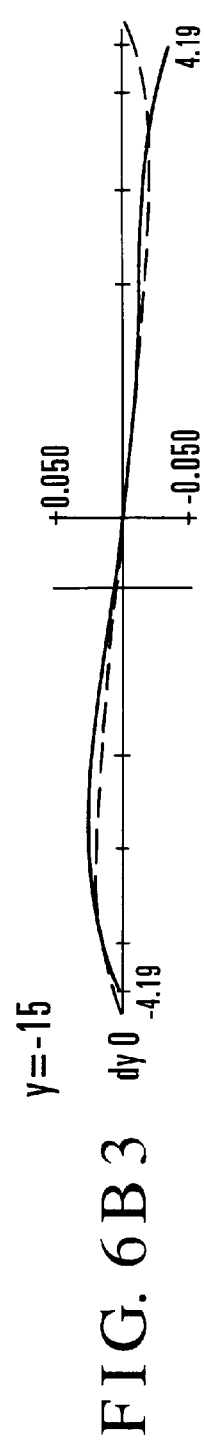
FIG. 6A1  FIG. 6A2  FIG. 6B1  FIG. 6B2  FIG. 6B3

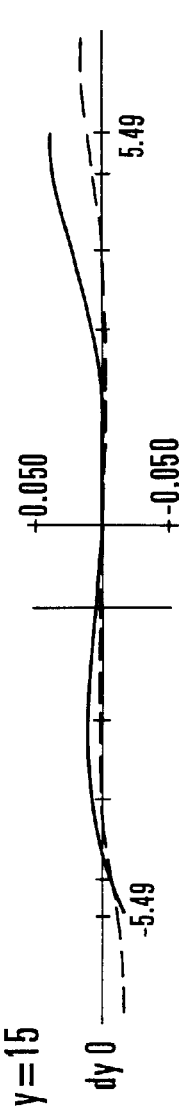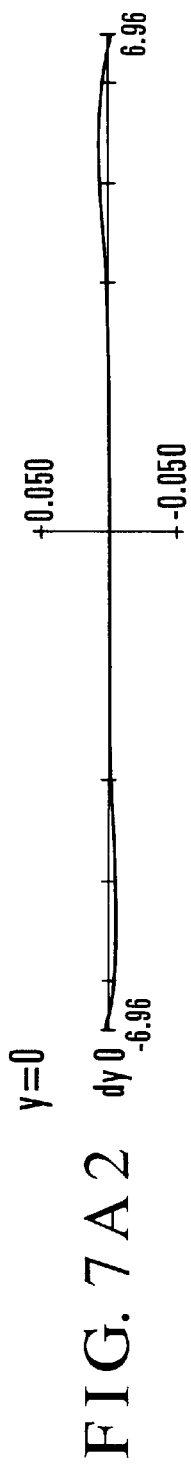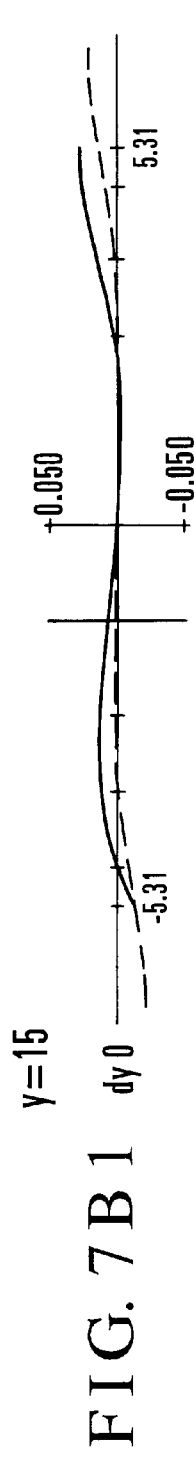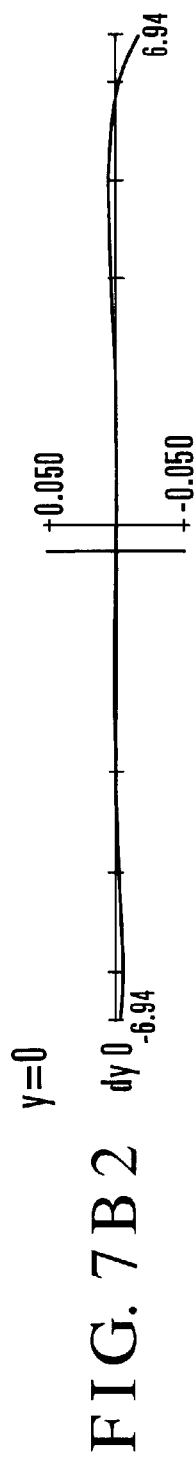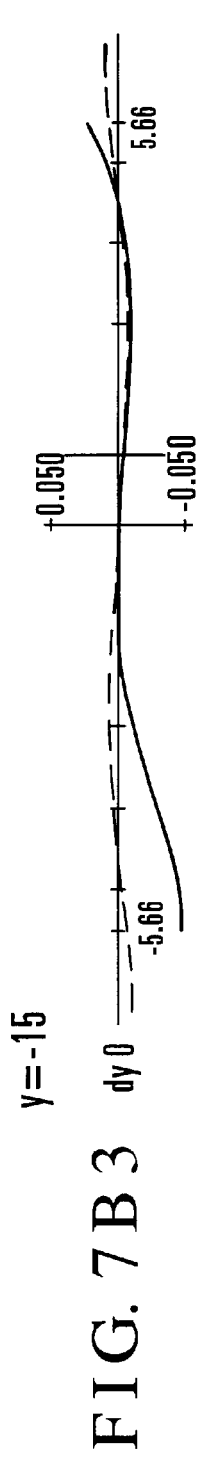
FIG. 7A1   FIG. 7A2   FIG. 7B1   FIG. 7B2   FIG. 7B3

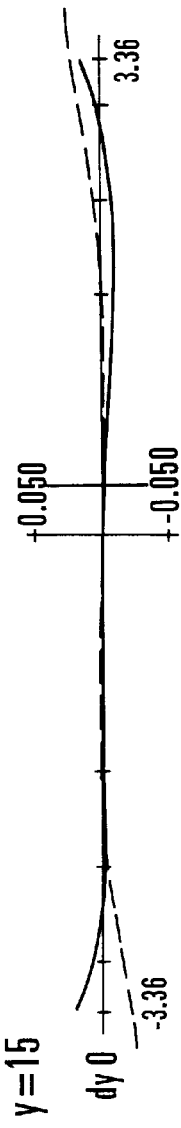
FIG. 8A1
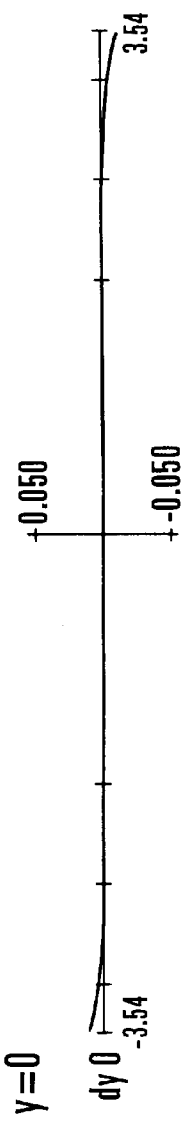
FIG. 8A2
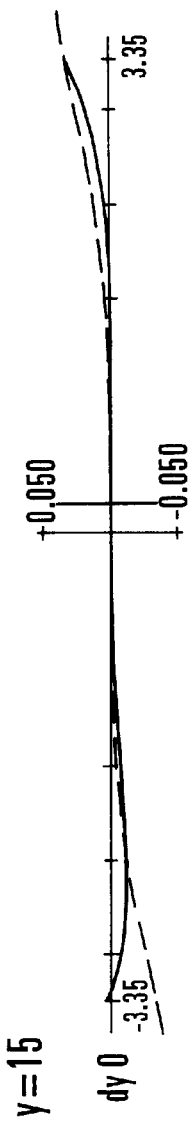
FIG. 8B1
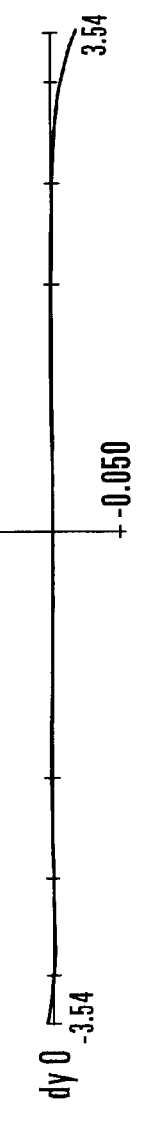
FIG. 8B2
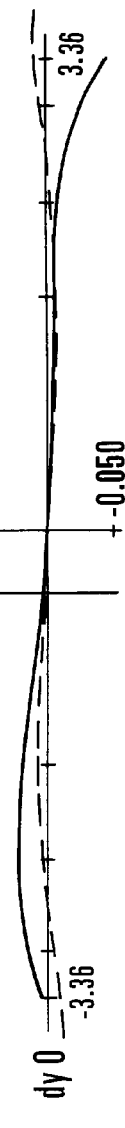
FIG. 8B3

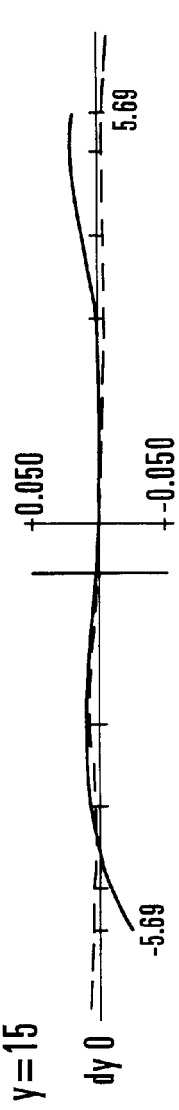
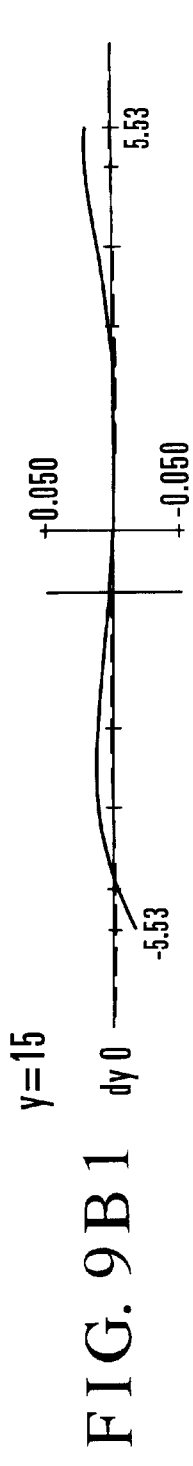
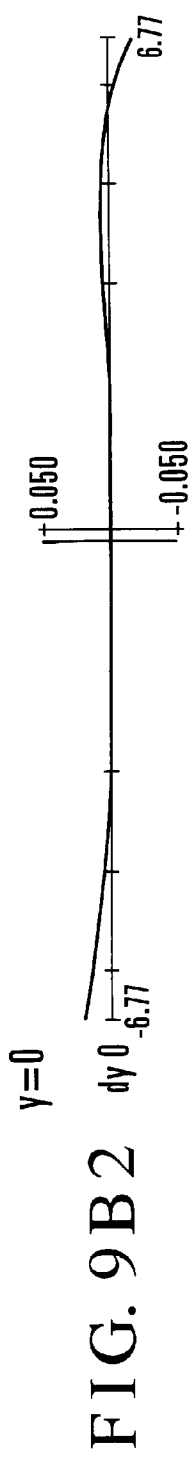
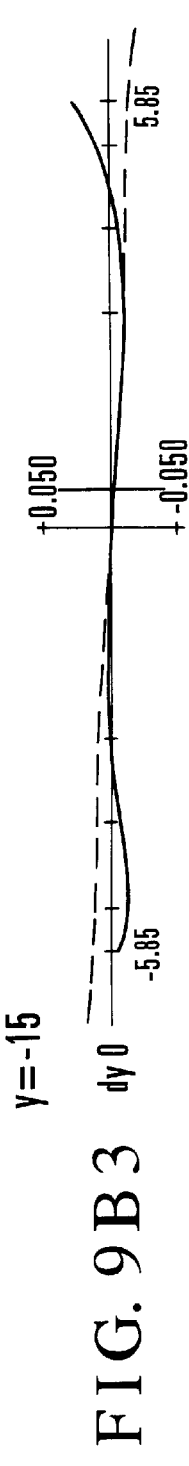
FIG. 9A1  FIG. 9A2  FIG. 9B1  FIG. 9B2  FIG. 9B3

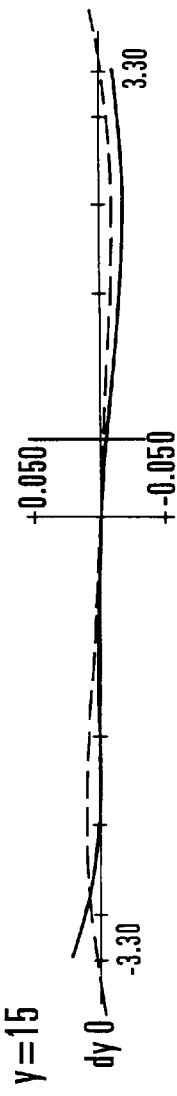
FIG.10A1
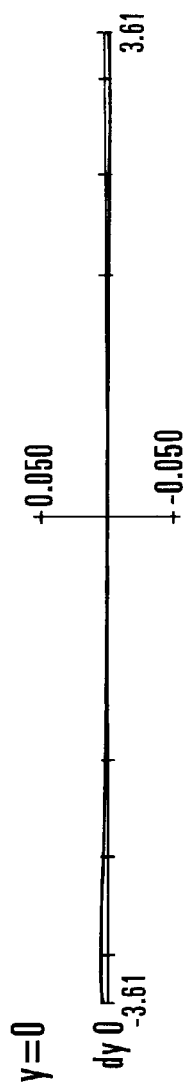
FIG.10A2
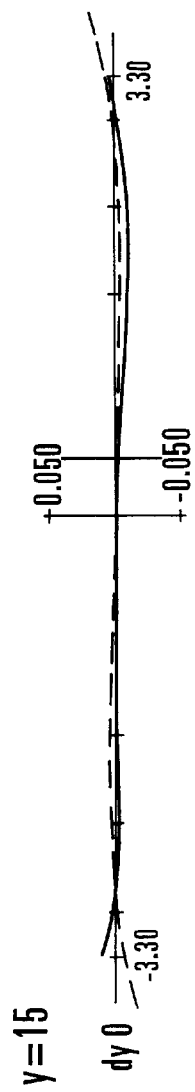
FIG.10B1
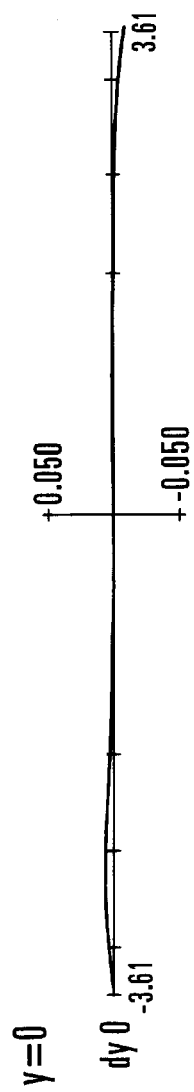
FIG.10B2
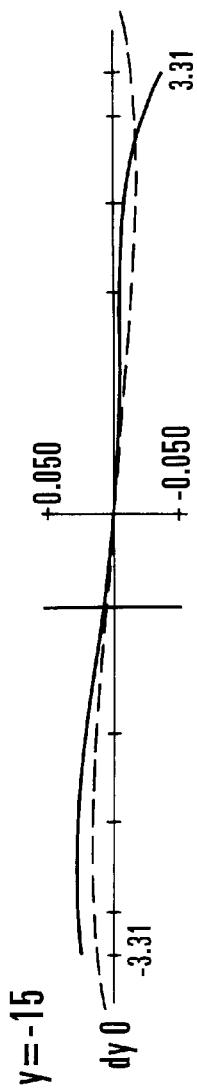
FIG.10B3

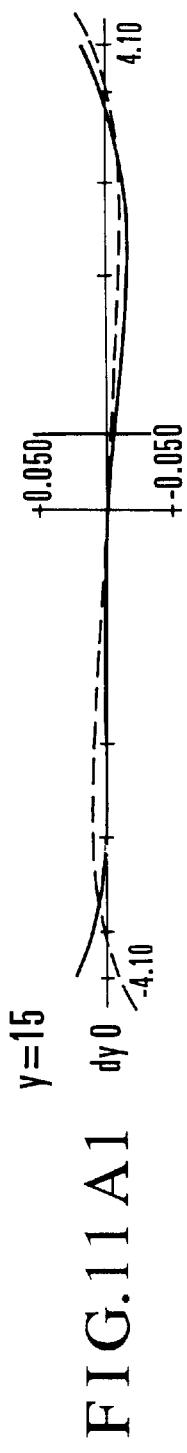# FIG.11A1
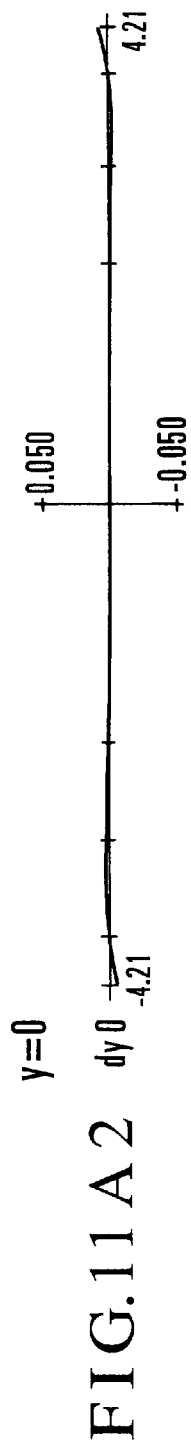# FIG.11A2
# FIG.11B1
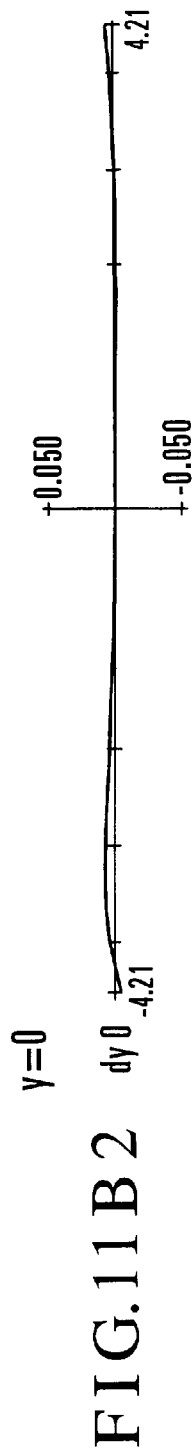# FIG.11B2
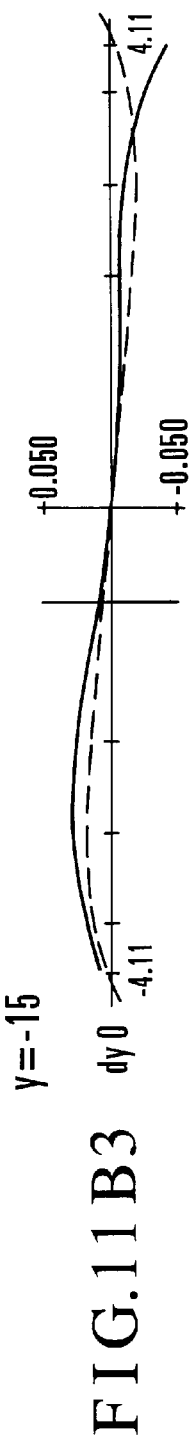# FIG.11B3

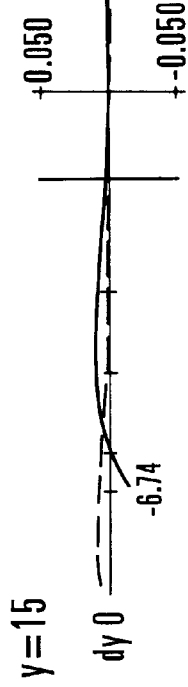
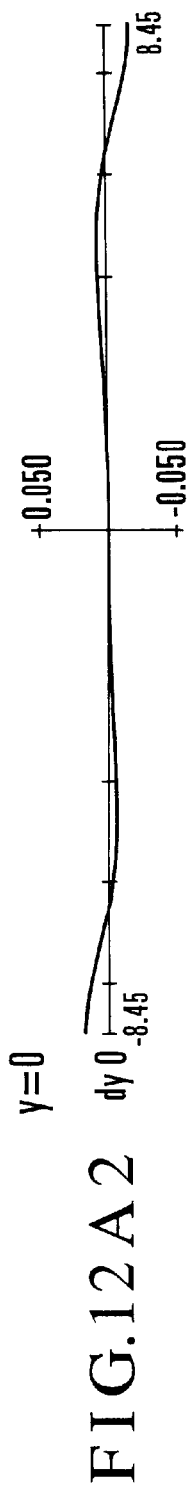
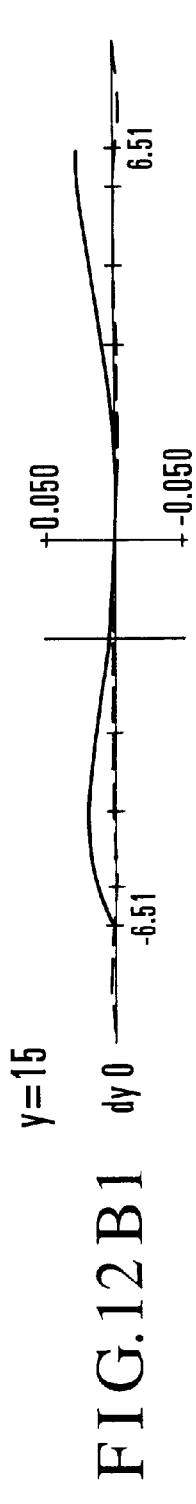
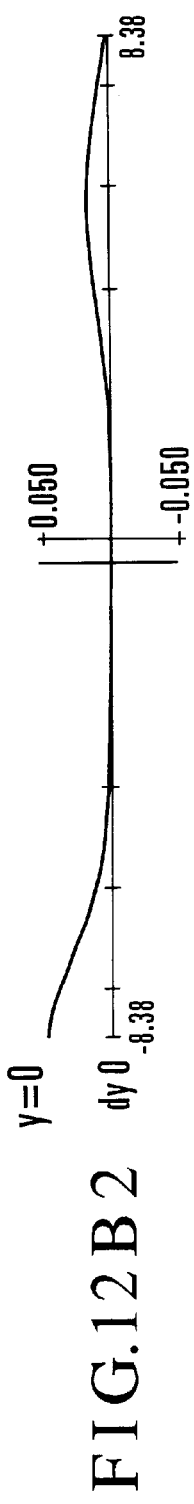
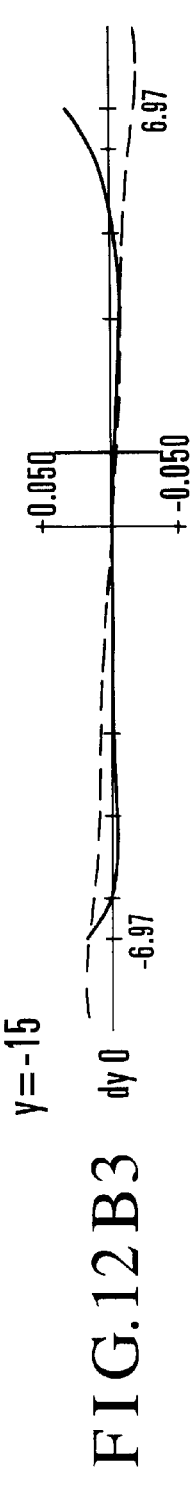
FIG.12A1  FIG.12A2  FIG.12B1  FIG.12B2  FIG.12B3

VARIABLE MAGNIFICATION OPTICAL SYSTEM AND OPTICAL APPARATUS HAVING IMAGE STABILIZING FUNCTION

BACKGROUND OF THE INVENTION

1. Field of the Invention

The present invention relates to variable magnification optical systems and, more particularly, to a variable magnification optical system having an image stabilizing function in which one lens unit, constituting a part of the variable magnification optical system, is so moved as to have directional components perpendicular to an optical axis to optically compensate for the shaking of a photographed image caused by the vibration (tilting) of the variable magnification optical system, thereby obtaining a stabilized image, and which optical system is suited to photographic cameras, electronic cameras, video cameras or the like.

2. Description of Related Art

When shooting is being performed by using a photographic system on a running car, or flying air plane, or the like moving vehicle, the vibrations propagate to the photographic system, thereby causing the shaking of a photographed image in some cases. Also, when not on the moving vehicle, but when the photographer unstably holds the photographic system by the hand, it often happens that the vibration of the hand causes the shaking of a photographed image. As the focal length of the photographic system increases to the telephoto region, in particular, the frequency of occurrence of the shaking of a photographed image increases rapidly.

Heretofore, there have been proposed a variety of optical systems having an image stabilizing function of preventing the shaking of a photographed image from occurring in such situations.

For example, in Japanese Laid-Open Patent Application No. Hei 5-232410, there is disclosed a zoom lens of the telephoto type comprising four lens units of positive, negative, positive and positive refractive powers in this order from the object side, wherein the second lens unit is made to move in directions perpendicular to an optical axis, thereby stabilizing the image.

In another Japanese Laid-Open Patent Application No. Hei 7-152002, there is disclosed a zoom lens comprising four lens units of negative, positive, negative and positive refractive powers in this order from the object side, wherein the third lens unit is made to move in directions perpendicular to an optical axis, thereby stabilizing the image.

Also, in Japanese Laid-Open Patent Application No. Hei 7-199124, there is disclosed a variable magnification optical system comprising four lens units of positive, negative, positive and positive refractive powers in this order from the object side, wherein the entirety of the third lens unit is made to move in directions perpendicular to an optical axis, thereby stabilizing the image.

In general, an image stabilizing optical system in which a lens constituting a part of the optical system is made to decenter in parallel with directions perpendicular to the optical axis so as to stabilize the image, has such an advantage that there is no need to use an additional special optical element for stabilizing the image.

However, this method requires creation of a space in which to move the moving lens unit. Another problem of this method is that, if an improper one of the lens units is selected to decenter in parallel, the produced amount of decentering aberrations becomes larger.

BRIEF SUMMARY OF THE INVENTION

The present invention is applied to a variable magnification optical system in which a lens unit constituting a part of the variable magnification optical system is so moved as to have directional components perpendicular to an optical axis to compensate for the shaking of an image caused by the vibration (tilting) of the variable magnification optical system, and sets forth appropriate rules of design for the form and the construction and arrangement of the constituent lenses of the variable magnification optical system. It is, therefore, an object of the invention to provide a variable magnification optical system having an image stabilizing function with the bulk and size of the entire system reduced to a compact form, with the operating system simplified in structure and with the load on the driving means lowered, while, when the lens unit is made to decenter to compensate for the shaking of an image, still permitting the produced amount of decentering aberrations to be suppressed to a minimum.

To attain the above object, in accordance with an aspect of the invention, there is provided a variable magnification optical system having an image stabilizing function, which comprises, in order from an object side, a first lens unit of negative refractive power, a second lens unit of positive refractive power, a third lens unit of negative refractive power and a fourth lens unit of positive refractive power, wherein the separation between every successive two of the first to fourth lens units is varied to effect variation of magnification, and the third lens unit is so moved as to have directional components perpendicular to an optical axis to compensate for shaking of an image caused by vibration of the variable magnification optical system, the variable magnification optical system satisfying the following conditions:

$$D1W > D1T \quad (1)$$

$$D2W < D2T \quad (2)$$

$$D3W > D3T \quad (3)$$

$$1.5 < |f3|/f2 < 2.5 \quad (4)$$

$$2.1 < f4/f2 < 10 \quad (5)$$

where $DiW$ and $DiT$ are separations between the i-th lens unit and the (i+1)st lens unit in a wide-angle end and in a telephoto end, respectively, and fi is the focal length of the i-th lens unit.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 5A1 and 5A2 are graphic representations of the aberrations for the normal state of the variable magnification optical system of the numerical example 1 at the wide-angle end, and FIGS. 5B1 to 5B3 are similar graphs obtained during the image stabilizing operation for the tilting of 0.5° of the variable magnification optical system.

FIGS. 6A1 and 6A2 are graphic representations of the aberrations for the normal state of the variable magnification optical system of the numerical example 1 at the telephoto end, and FIGS. 6B1 to 6B3 are similar graphs obtained during the image stabilizing operation for the tilting of 0.5° of the variable magnification optical system.

FIGS. 7A1 and 7A2 are graphic representations of the aberrations for the normal state of the variable magnification optical system of the numerical example 2 at the wide-angle end, and FIGS. 7B1 to 7B3 are similar graphs obtained during the image stabilizing operation for the tilting of 0.5° of the variable magnification optical system.

FIGS. 8A1 and 8A2 are graphic representations of the aberrations for the normal state of the variable magnification optical system of the numerical example 2 at the telephoto end, and FIGS. 8B1 to 8B3 are similar graphs obtained during the image stabilizing operation for the tilting of 0.5° of the variable magnification optical system.

FIGS. 9A1 and 9A2 are graphic representations of the aberrations for the normal state of the variable magnification optical system of the numerical example 3 in the wide-angle end, and FIGS. 9B1 to 9B3 are similar graphs obtained during the image stabilizing operation for the tilting of 0.5° of the variable magnification optical system.

FIGS. 10A1 and 10A2 are graphic representations of the aberrations for the normal state of the variable magnification optical system of the numerical example 3 at the telephoto end, and FIGS. 10B1 to 10B3 are similar graphs obtained during the image stabilizing operation for the tilting of 0.5° of the variable magnification optical system.

FIGS. 11A1 and 11A2 are graphic representations of the aberrations for the normal state of the variable magnification optical system of the numerical example 4 at the wide-angle end, and FIGS. 11B1 to 11B3 are similar graphs obtained during the image stabilizing operation for the tilting of 0.5° of the variable magnification optical system.

FIGS. 12A1 and 12A2 are graphic representations of the aberrations for the normal state of the variable magnification optical system of the numerical example 4 at the telephoto end, and FIGS. 12B1 to 12B3 are similar graphs obtained during the image stabilizing operation for the tilting of 0.5° of the variable magnification optical system.

DETAILED DESCRIPTION OF THE INVENTION

Hereinafter, preferred embodiments of the invention will be described in detail with reference to the drawings.

FIGS. 1 to 4 are sectional views respectively showing first to fourth numerical examples 1 to 4 of the variable magnification optical system in the wide-angle end, whose data will be given later.

In FIGS. 1 to 4, the variable magnification optical system comprises, in order from an object side, a first lens unit L1 of negative refractive power, a second lens unit L2 of positive refractive power, a third lens unit L3 of negative refractive power and a fourth lens unit L4 of positive refractive power. Reference symbol SP denotes a stop, and reference symbol P denotes a flare cutter.

Figure 1:
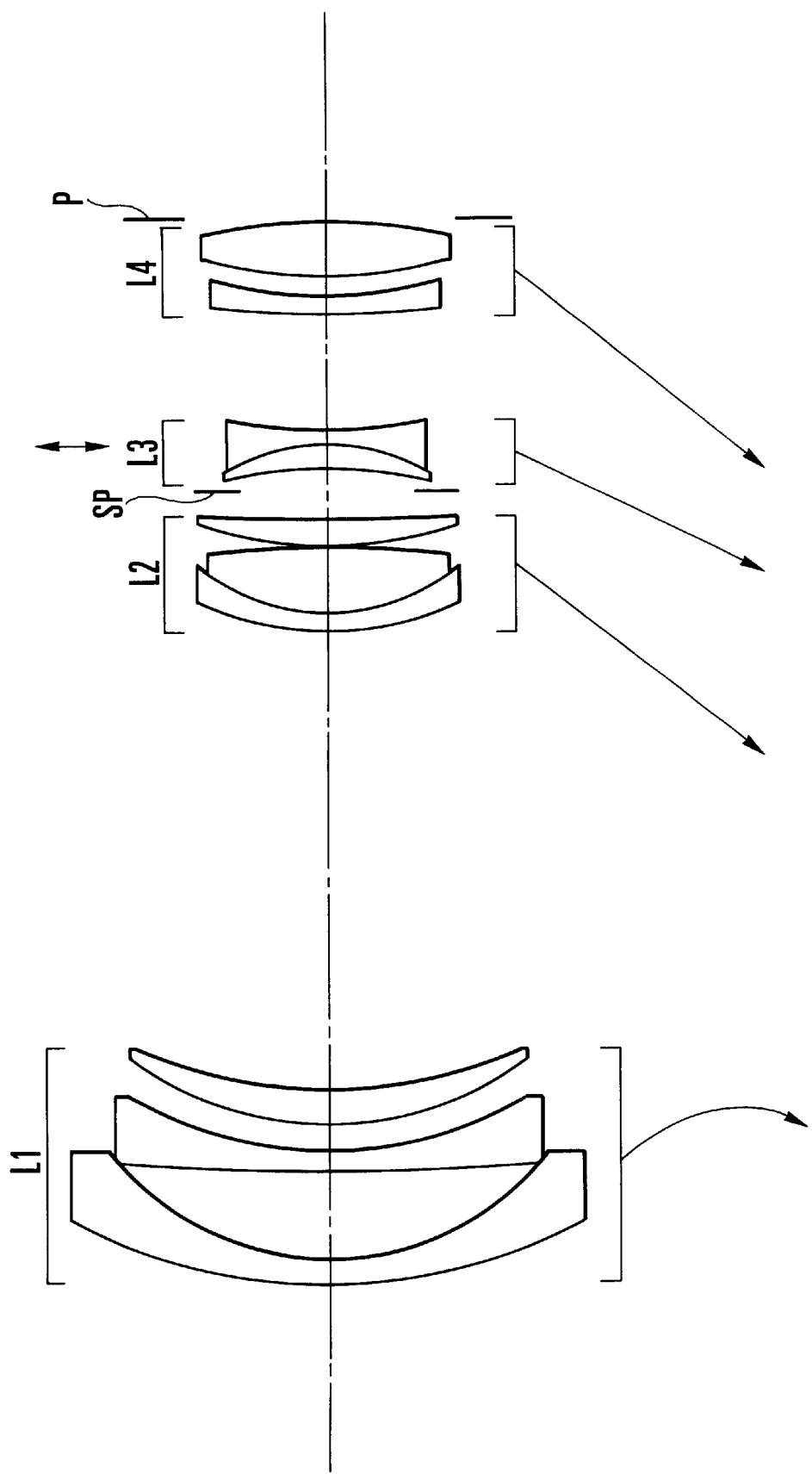
FIG. 1 is a longitudinal section view of a numerical example 1 of the variable magnification optical system at the wide-angle end.
Figure 2:
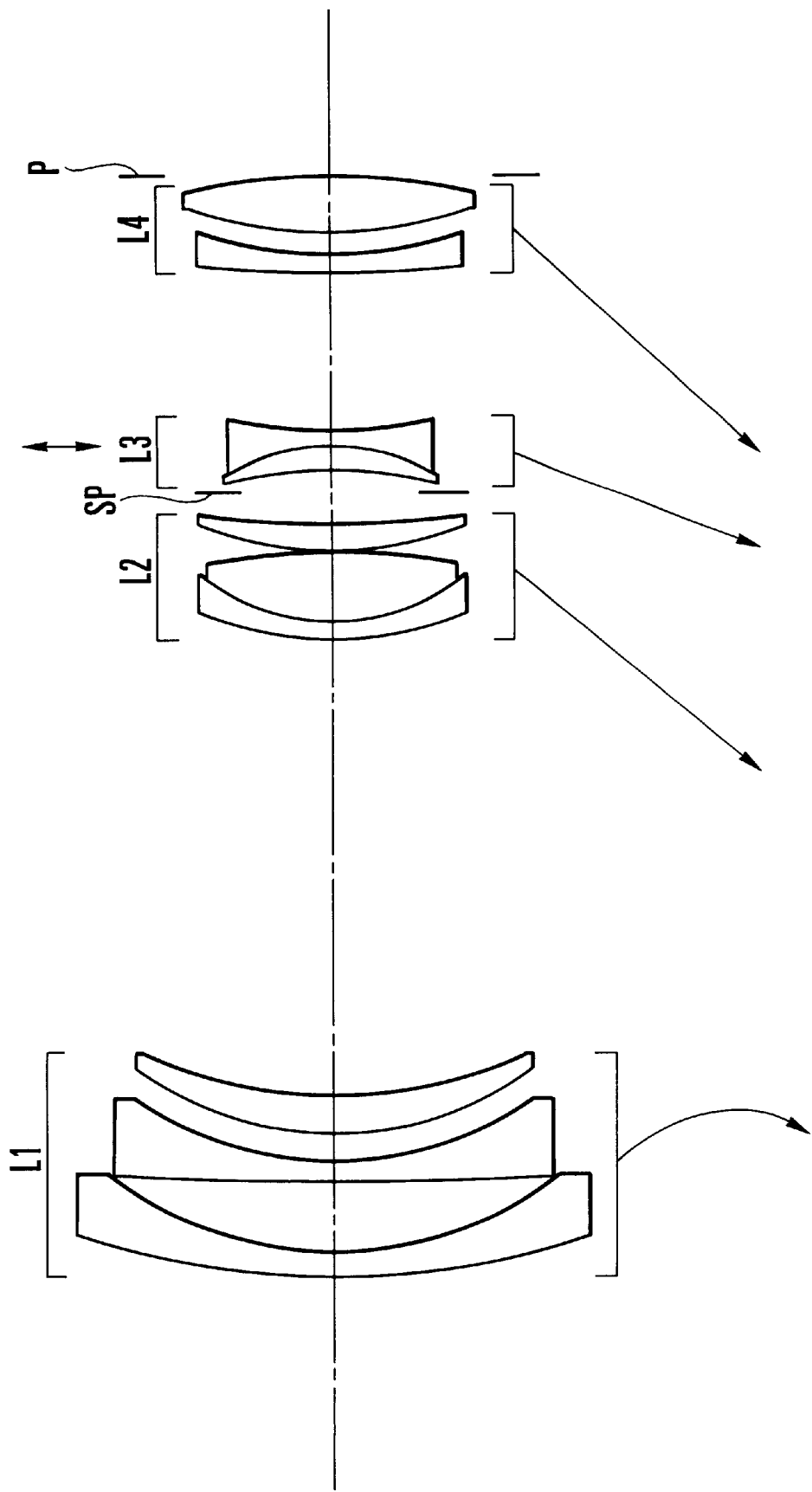
FIG. 2 is a longitudinal section view of a numerical example 2 of the variable magnification optical system at the wide-angle end.
Figure 4:
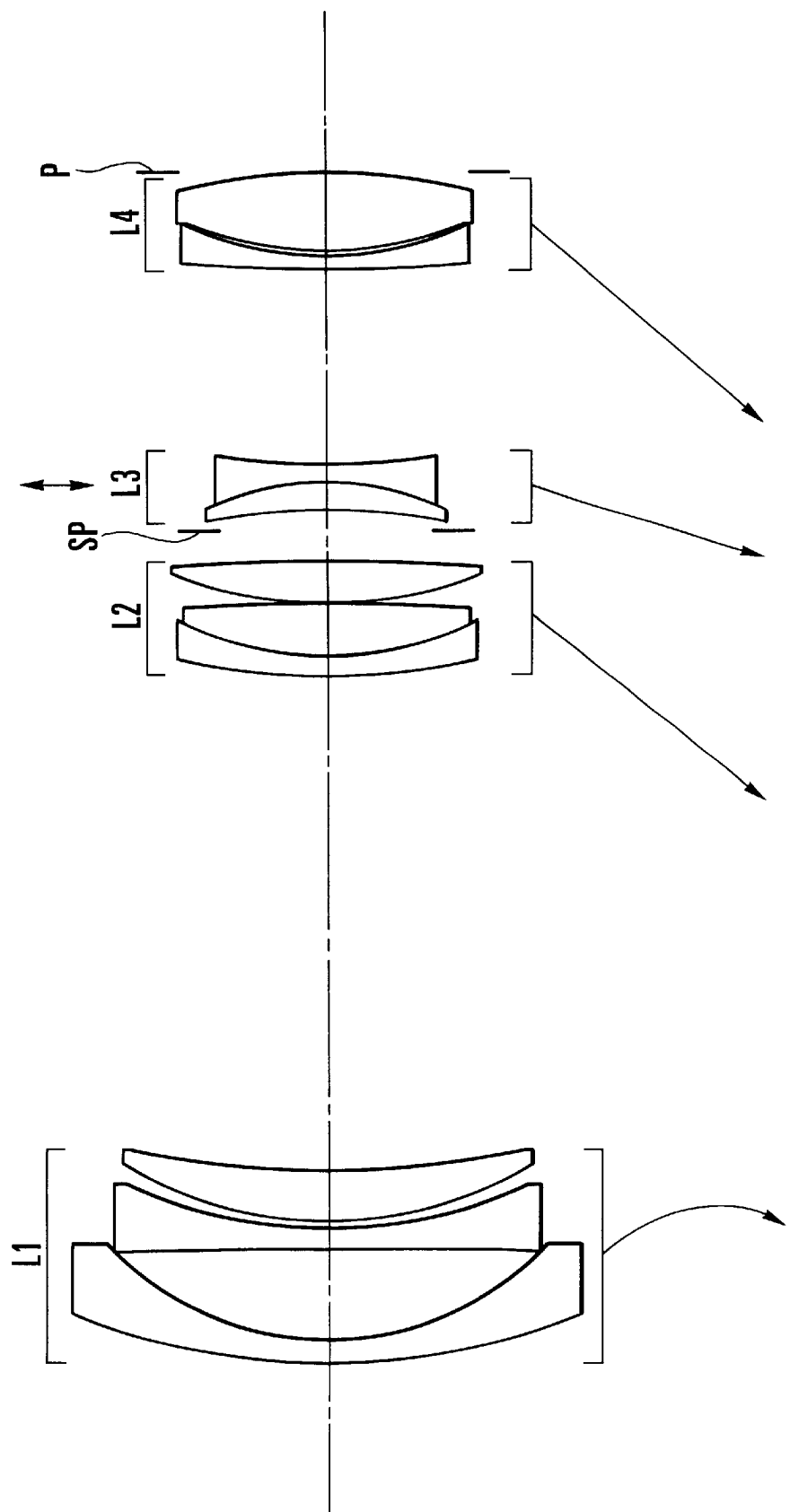
FIG. 4 is a longitudinal section view of a numerical example 4 of the variable magnification optical system at the wide-angle end.

In the numerical examples 1, 2 and 4 shown in FIGS. 1, 2 and 4, respectively, during zooming from the wide-angle end to the telephoto end, the first lens unit L1 axially moves in a locus convex toward the image side, and the second lens unit L2 to the fourth lens unit L4 axially move toward the object side, as shown by the arrows.

Figure 3:
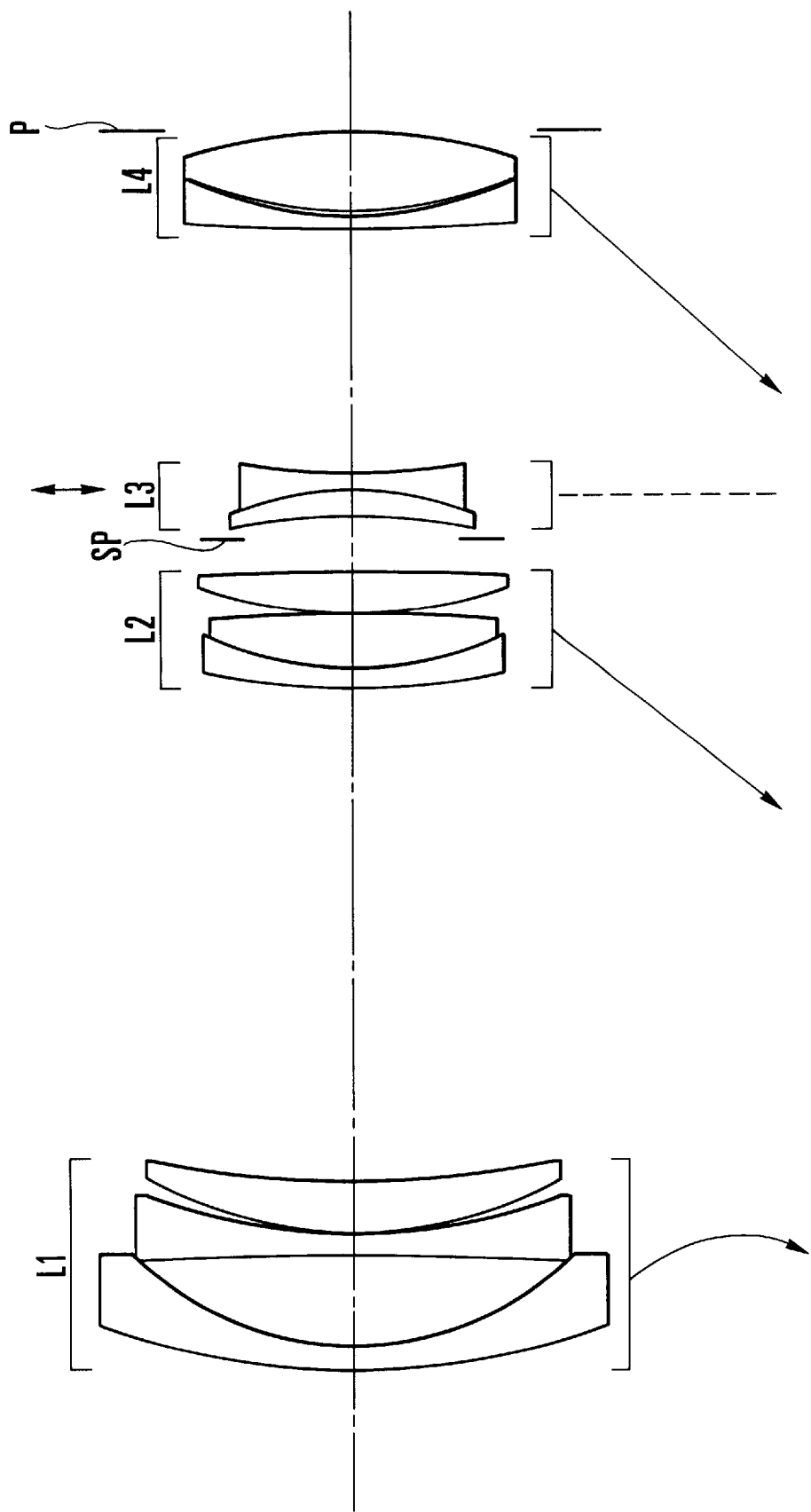
FIG. 3 is a longitudinal section view of a numerical example 3 of the variable magnification optical system at the wide-angle end.

In the numerical example 3 shown in FIG. 3, during zooming from the wide-angle end to the telephoto end, the first lens unit L1 axially moves in a locus convex toward the image side, and the second lens unit L2 and the fourth lens unit L4 axially move toward the object side, as shown by the arrows. In all the numerical examples 1 to 4, the second lens unit L2 and the fourth lens unit L4 move integrally with each other.

During zooming, the stop SP moves integrally with the third lens unit L3.

In the present embodiments, the third lens unit L3 is made to move in directions perpendicular to an optical axis to compensate for the shaking of an image caused by the vibration of the variable magnification optical system. Incidentally, the stop SP remains stationary during the image stabilizing operation.

In the present embodiments, the stop SP is disposed just before the third lens unit L3 and is moved integrally with the third lens unit L3 during zooming, thereby lessening the variation of the aberrations attributable to the movable lens units. Also, the separation between the lens units that precede the stop SP, i.e., the first lens unit L1 and the second lens unit L2, is made shorter as zooming goes to the telephoto end, thereby making it easy to achieve reduction of the diameter of the front lens members. Focusing is performed by moving the first lens unit L1, but one of the other lens units may be used instead.

A variable magnification optical system having an image stabilizing function according to the invention is attained with all the lens units arranged in such a manner as described above, during zooming and during the image stabilizing operation. Moreover, the above-described conditions (1) to (5) are satisfied to thereby simultaneously fulfill the requirements of advantageously securing the desired zoom ratio and of minimizing the decentering aberrations during the image stabilizing operation. The difference in image quality between in the normal state (i.e., when the image stabilizing operation is not performed) and during the image stabilizing operation is thus reduced to a minimum for a good optical performance.

The technical significance of each of the above-described conditions (1) to (5) is explained below.

The inequalities of conditions (1) to (3) specify the relation in which all the lens units of certain refractive powers axially move during zooming from the wide-angle end to the telephoto end. By this relation, the zoom ratio is secured at a predetermined value with a high efficiency, while still assuring minimization of the size of the entire optical system.

The inequalities of conditions (4) and (5) give ranges for the focal lengths of the third lens unit L3 and the fourth lens unit L4 relative to the focal length of the second lens unit L2 and have an aim chiefly to maintain good stability of optical performance during the image stabilizing operation. When the lower limits of the conditions (4) and (5) are exceeded, as this means that the refractive powers of the third lens unit L3 and the fourth lens unit L4 are too strong, large decentering aberrations are objectionably produced during the image stabilizing operation. When the refractive powers of the third lens unit L3 and the fourth lens unit L4 become too weak beyond the upper limits of the conditions (4) and (5), the total length of the entire optical system becomes undesirably longer.

Next, the way of finding out a paraxial refractive power arrangement for satisfying the above-described conditions is described. Letting the powers at the wide-angle end and the telephoto end of the entire optical system be denoted by $\phi w$ and $\phi t$, respectively, letting the power of the first lens unit L1 be denoted by $\phi 1$, letting the power of the second lens unit L2 be denoted by $\phi 2$, and letting the principal point intervals at the wide-angle end and the telephoto end between the i-th lens unit and the (i+1)st lens unit be denoted by Eiw and Eit, respectively, for given values of these parameters, the power $\phi 3$ of the third lens unit L3 and the power $\phi 4$ of the fourth lens unit L4 as unknown quantities are determined to obtain Gaussian brackets Aijw, Cijw and Aijt, Cijt of the i-th lens unit to the (i+1)st lens unit at the wide-angle end and the telephoto end. Then, the following expressions are obtained:

$$\phi w = C14w = -A13w \cdot E3w \cdot \phi 3 \cdot \phi 4 - C12w \cdot E3w \cdot \phi 4 + A13w \cdot \phi 4 + A13w \cdot \phi 3 + C12w \quad (a)$$

$$\phi t = C14t = -A13t \cdot E3t \cdot \phi 3 \cdot \phi 4 - C12t \cdot E3t \cdot \phi 4 + A13t \cdot \phi 4 + A13t \cdot \phi 3 + C12t \quad (b)$$

$Vw \equiv C12w \cdot E3w - A13w$ $Ww \equiv \phi w - C12w$ $Xw \equiv -E3w \cdot A13w$ $Yw \equiv A13w$ $Vt \equiv C12t \cdot E3t - A13t$ $wt \equiv \phi t - C12t$ $Xt \equiv -E3t \cdot A13t$ $Yt \equiv A13t$ From the equations (a) and (b) described above, the following equations are obtained:

$$\phi 3 = (Vw \cdot \phi 4 + Ww)/(Xw \cdot \phi 4 + Yw) \quad (c)$$

$$\phi 3 = (Vt \cdot \phi 4 + Wt)/(Xt \cdot \phi 4 + Yt) \quad (d)$$

From the equations (c) and (d), $\phi 4$ is found as two solutions of the following equation:

$$(VwXt - VtXw)\phi 4^2 + (VwYt + XtWw - VtYw - XwWt)\phi 4 + (WwYt - WtYw) = 0 \quad (e)$$

For $\phi 3$, too, from the equation (c), two values are found in correspondence to the respective values of $\phi 4$ described above.

In the present embodiments, among the two pairs of solutions, the weaker pair of solutions in refractive power is selected to be given to the third lens unit L3 and the fourth lens unit L4, thereby making it possible to correct aberrations well even during the image stabilizing operation.

The above-described conditions suffice for realizing a variable magnification optical system having an image stabilizing function according to the invention. However, to further improve the optical performance with the limitation of the total length of the entire optical system to a minimum, it is preferable to satisfy at least one of the following features or conditions:

(a-1) The third lens unit L3 consists of a positive lens and a negative lens, and the fourth lens unit L4 includes a negative lens and a positive lens.

By this arrangement, on the premise of selecting such a paraxial refractive power arrangement as described above, the aberrations are corrected well.

(a-2) The distance OK4 (from the most image side surface of the fourth lens unit) of the rear principal point of the fourth lens unit L4 lies within the following range:

$$0 < OK4 \quad (6)$$

The term "distance OK4" used herein is taken as positive when measured from the fourth lens unit L4 to the image side. The inequality of condition (6) is for constructing the fourth lens unit L4 in the form of the retro type. With this arrangement, while the bulk and size of the entire optical system are minimized, all aberrations are corrected well.

(a-3) The fourth lens unit L4 has at least one aspheric surface.

In this case, the aspheric surface is applied to a convex surface on the image side of the positive lens of the fourth lens unit L4 and is formed to such a shape that the negative refractive power becomes progressively stronger as the distance increases from the center of the lens to the margin, thereby correcting well the sagittal field curvature of higher orders that is produced in the wide-angle region.

(a-4) The stop SP is provided as disposed on the object side or image side of the third lens unit L3 to remain stationary (i.e., not to decenter in parallel) during the image stabilizing operation.

This enables the outer diameters of the first lens unit L1 and the fourth lens unit L4 to be minimized and assures good balance of the corrected aberrations.

(a-5) The second lens unit L2 and the fourth lens unit L4 move integrally with each other during zooming.

This assists in simplifying the structure of construction of the zooming mechanism, while securing the predetermined zoom ratio.

(a-6) In order from the object side, the first lens unit L1 consists of a negative lens of meniscus form concave toward the image side, a negative lens having a concave surface facing the image side and a positive lens of meniscus form convex toward the object side, the second lens unit L2 consists of a negative lens of meniscus form concave toward the image side, a positive lens of bi-convex form and a positive lens having a convex surface facing the object side, the third lens unit L3 consists of a positive lens of meniscus form convex toward the image side and a negative lens of bi-concave form, and the fourth lens unit L4 consists of a negative lens of meniscus form concave toward the image side and a positive lens of bi-convex form.

This arrangement improves the compact form of the entire optical system, simplifies the structure of the mounting mechanism, and reduces the load on the operating mechanism, while, when the lens unit L3 is made to decenter for stabilizing an image, still permitting the produced amount of decentering aberrations to be suppressed to a minimum.

(a-7) Letting the sensitivity to parallel decentering of the third lens unit L3 at the telephoto end be denoted by TS3t, letting the focal lengths in the wide-angle end and the telephoto end of the entire optical system be denoted by fW and fT, respectively, letting the F-number in the telephoto end of the entire optical system be denoted by FNot, and letting the amounts of variation of the separations between the first lens unit L1 and the second lens unit L2 and between the second lens unit L2 and the third lens unit L3 during zooming from the wide-angle end to the telephoto end be denoted by $\Delta 12$ and $\Delta 23$, respectively, at least one of the following conditions is satisfied:

$$1.1 < |TS3t| \quad (7)$$

$$0.6 < |f1|/\sqrt{fW \cdot fT} < 1.3 \quad (8)$$

$$1.3 < f2 \cdot FNot/fT < 3.5 \quad (9)$$

$$0.2 < |\Delta 23/\Delta 12| < 0.6 \quad (10)$$

In order to limit the consumption of energy to a minimum in the driving motion of the lens unit for stabilizing an image, it is necessary to decrease the size of the moving mechanism and the weight of the image-stabilizing lens unit. Nonetheless, it is also necessary to increase the sensitivity to parallel decentering of the image-stabilizing lens unit.

The term "sensitivity to parallel decentering" herein used means the ratio of the amount of movement of the image point on the focal plane to the amount of movement of the lens unit perpendicular to the optical axis.

In general, the sensitivity TSi to parallel decentering of the i-th lens unit is calculated by the following formula:

$$TSi = (1-\beta i)\beta i+1 \cdot \cdot \cdot \beta n$$

where βi is the magnification of the i-th lens unit.

In the present embodiments, such a lens arrangement as to satisfy the condition (7) is adopted. When the lower limit of the condition (7) is exceeded, as this means that the sensitivity to parallel decentering of the image-stabilizing lens unit is too small, and the moving mechanism for stabilizing an image increases in size objectionably. To lighten the weight of the image-stabilizing lens unit, the aperture stop is fixed in the direction perpendicular to the optical axis during the image stabilizing operation.

The conditions (8), (9) and (10) in application to the 4-unit zoom lens of minus-plus-minus-plus refractive power arrangement, have an aim to achieve the desired specification, while still permitting the image quality to be improved to a satisfactory level with the bulk and size of the entire optical system reduced to a compact form.

When the lower limit of the condition (8) is exceeded, as this means that the negative refractive power of the first lens unit L1 is too strong, it becomes difficult to correct aberrations well. When the negative refractive power of the first lens unit L1 is too weak beyond the upper limit, the size of the optical system increases objectionably. When the lower limit of the condition (9) is exceeded, as this means that the positive refractive power of the second lens unit L2 is too strong, it favors the shortening of the total length of the entire optical system, but all aberrations the second lens unit L2 produces increase, which become difficult to correct well in good balance. When the upper limit is exceeded, the total length of the entire optical system increases objectionably. When the lower limit of the condition (10) is exceeded, as this means that the amount of variation of the separation between the second lens unit L2 and the third lens unit L3 during zooming from the wide-angle end to the telephoto end is shorter than that of the separation between the first lens unit L1 and the second lens unit L2, the configuration becomes close to the 2-unit zoom lens of minus-plus refractive power arrangement, so that the advantage of improving the compact form by adopting the multi-unit technique diminishes. When the upper limit is exceeded, the outer diameter of the fourth lens unit L4 increases objectionably.

Next, four numerical examples 1 to 4 of the invention are shown. In the numerical data for the examples 1 to 4, ri is the radius of curvature of the i-th surface when counted from the object side, di is the i-th lens thickness or air separation when counted from the object side, and ni and vi are respectively the refractive index and Abbe number of the glass of the i-th lens element when counted from the object side.

The values of the factors in the above-described conditions (4) to (10) for the numerical examples 1 to 4 are listed in Table-1.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1+\sqrt{1-(H/R)^2}} + bH^4 + cH^6 + dH^8 + eH^{10}$$

where R is the radius of the osculating sphere, and b, c, d and e are the aspheric coefficients. The values of the aspheric coefficients are also tabulated where the notation "e-0X" means "$10^{-X}$".

Numerical Example 1:

```
f = 29.6~81.5        Fno = 4.1~5.9        2ω = 72.3°~29.7°
r  1 =  43.437    d  1 = 1.80       n 1 = 1.69680    ν 1 = 55.5
r  2 =  21.458    d  2 = 6.56
r  3 = 229.741    d  3 = 1.50       n 2 = 1.72916    ν 2 = 54.7
r  4 =  30.449    d  4 = 1.90
r  5 =  25.886    d  5 = 2.73       n 3 = 1.84666    ν 3 = 23.8
r  6 =  37.968    d  6 = Variable
r  7 =  24.231    d  7 = 1.30       n 4 = 1.80518    ν 4 = 25.4
r  8 =  14.955    d  8 = 5.00       n 5 = 1.55963    ν 5 = 61.2
r  9 = -88.239    d  9 = 0.15
r10 =  31.026     d10 = 2.00        n 6 = 1.69680    ν 6 = 55.5
r11 = 224.789     d11 = Variable
r12 = ∞ (stop)    d12 = 1.75
r13 = -33.283     d13 = 1.70        n 7 = 1.84666    ν 7 = 23.8
r14 = -16.122     d14 = 1.10        n 8 = 1.60562    ν 8 = 43.7
r15 =  39.023     d15 = Variable
r16 =  77.037     d16 = 1.30        n 9 = 1.84666    ν 9 = 23.8
r17 =  30.801     d17 = 1.60
r18 =  35.956     d18 = 4.00        n10 = 1.51633    ν10 = 64.1
*r19 = -39.173    d19 = Variable
r20 = ∞
```

*) Aspheric Surface

| Variable | Focal Length | | |
|---|---|---|---|
| Separation | 29.62 | 54.22 | 81.49 |
| d 6 | 34.28 | 10.47 | 1.13 |
| d11 | 2.14 | 5.93 | 9.72 |
| d15 | 8.62 | 4.83 | 1.04 |
| d19 | 0.00 | 14.49 | 28.98 |

Aspheric Coefficients:

| r19: | b = 1.416455e-05 | c = 2.139864e-09 |
|---|---|---|
| | d = 9.652477e-10 | e = -5.607167e-12 |

Numerical Example 2:

```
f = 29.0~81.9        Fno = 4.1~5.9        2ω = 73.4°~29.6°
r  1 =  61.487    d  1 = 1.80       n 1 = 1.69680    ν 1 = 55.5
r  2 =  27.511    d  2 = 5.06
r  3 = 307.265    d  3 = 1.50       n 2 = 1.69680    ν 2 = 55.5
r  4 =  26.277    d  4 = 1.90
r  5 =  24.934    d  5 = 2.73       n 3 = 1.84666    ν 3 = 23.8
r  6 =  34.627    d  6 = Variable
r  7 =  25.731    d  7 = 1.30       n 4 = 1.80518    ν 4 = 25.4
r  8 =  15.576    d  8 = 5.00       n 5 = 1.55963    ν 5 = 61.2
r  9 = -55.177    d  9 = 0.15
r10 =  26.449     d10 = 2.00        n 6 = 1.69680    ν 6 = 55.5
r11 =  89.109     d11 = Variable
r12 = ∞ (Stop)    d12 = 1.75
r13 = -31.195     d13 = 1.70        n 7 = 1.84666    ν 7 = 23.8
r14 = -15.143     d14 = 1.10        n 8 = 1.60562    ν 8 = 43.7
```

-continued

| r15 = 38.686 | d15 = Variable | | |
|---|---|---|---|
| r16 = 93.992 | d16 = 1.30 | n 9 = 1.84666 | ν 9 = 23.8 |
| r17 = 32.153 | d17 = 1.60 | | |
| r18 = 33.217 | d18 = 4.00 | n10 = 1.51633 | ν10 = 64.1 |
| *r19 = −39.152 | d19 = Variable | | |
| r20 = ∞ | | | |

*) Aspheric Surface

| Variable | Focal Length | | |
|---|---|---|---|
| Separation | 29.04 | 54.00 | 81.87 |
| d 6 | 32.92 | 9.94 | 1.20 |
| d11 | 2.14 | 7.22 | 12.29 |
| d15 | 11.38 | 6.30 | 1.23 |
| d19 | 0.00 | 12.96 | 25.93 |

Aspheric Coefficients:

| r19: | b = 1.495083e−05 | c = 7.974152e−08 |
|---|---|---|
| | d = −1.602771e−10 | e = 3.818354e−13 |

Numerical Example 3

| f = 29.6~74.8 | Fno = 3.5~4.5 | 2ω = 72.2°~32.2° | |
|---|---|---|---|
| r 1 = 59.321 | d 1 = 1.80 | n 1 = 1.77250 | ν 1 = 49.6 |
| r 2 = 23.928 | d 2 = 6.90 | | |
| r 3 = −281.686 | d 3 = 1.60 | n 2 = 1.77250 | ν 2 = 49.6 |
| r 4 = 46.196 | d 4 = 0.10 | | |
| r 5 = 33.427 | d 5 = 3.90 | n 3 = 1.80518 | ν 3 = 25.4 |
| r 6 = 83.983 | d 6 = Variable | | |
| r 7 = 58.116 | d 7 = 1.45 | n 4 = 1.84666 | ν 4 = 23.8 |
| r 8 = 26.317 | d 8 = 0.12 | | |
| r 9 = 27.522 | d 9 = 4.00 | n 5 = 1.69680 | ν 5 = 55.5 |
| r10 = −134.358 | d10 = 0.10 | | |
| r11 = 36.762 | d11 = 3.15 | n 6 = 1.69680 | ν 6 = 55.5 |
| r12 = −228.351 | d12 = Variable | | |
| r13 = ∞ (Stop) | d13 = 1.75 | | |
| r14 = −47.294 | d14 = 2.10 | n 7 = 1.85026 | ν 7 = 32.3 |
| r15 = −23.767 | d15 = 1.30 | n 8 = 1.60311 | ν 8 = 60.6 |
| r16 = 50.584 | d16 = Variable | | |
| r17 = 168.851 | d17 = 1.00 | n 9 = 1.71736 | ν 9 = 29.5 |
| r18 = 29.281 | d18 = 0.40 | | |
| r19 = 32.347 | d19 = 6.00 | n10 = 1.60311 | ν10 = 60.6 |
| *r20 = −39.707 | d20 = Variable | | |
| r21 = ∞ | | | |

*) Aspheric Surface

| Variable | Focal Length | | |
|---|---|---|---|
| Separation | 29.65 | 51.68 | 74.83 |
| d 6 | 37.09 | 11.08 | 0.91 |
| d12 | 2.34 | 10.72 | 19.09 |
| d16 | 18.45 | 10.07 | 1.70 |
| d20 | 0.00 | 8.37 | 16.75 |

Aspheric Coefficients:

| r20: | b = 5.259191e−06 | c = −8.361761e−09 |
|---|---|---|
| | d = 1.127100e−10 | e = −3.658179e−13 |

Numerical Example 4:

| f = 29.5~76.1 | Fno = 3.5~4.5 | 2ω = 72.5°~31.7° | |
|---|---|---|---|
| r 1 = 54.782 | d 1 = 1.80 | n 1 = 1.77250 | ν 1 = 49.6 |
| r 2 = 23.790 | d 2 = 6.90 | | |
| r 3 = −626.792 | d 3 = 1.60 | n 2 = 1.77250 | ν 2 = 49.6 |
| r 4 = 38.638 | d 4 = 0.50 | | |
| r 5 = 31.839 | d 5 = 3.90 | n 3 = 1.80518 | ν 3 = 25.4 |
| r 6 = 79.657 | d 6 = Variable | | |
| r 7 = 54.334 | d 7 = 1.45 | n 4 = 1.84666 | ν 4 = 23.8 |
| r 8 = 24.872 | d 8 = 0.12 | | |
| r 9 = 25.990 | d 9 = 4.00 | n 5 = 1.69680 | ν 5 = 55.5 |
| r10 = −193.042 | d10 = 0.10 | | |
| r11 = 33.276 | d11 = 3.15 | n 6 = 1.69680 | ν 6 = 56.5 |
| r12 = −203.247 | d12 = Variable | | |
| r13 = ∞ (Stop) | d13 = 1.75 | | |
| r14 = −45.434 | d14 = 2.10 | n 7 = 1.85026 | ν 7 = 32.3 |
| r15 = −22.412 | d15 = 1.30 | n 8 = 1.60311 | ν 8 = 60.6 |
| r16 = 51.298 | d16 = Variable | | |
| r17 = 151.346 | d17 = 1.00 | n 9 = 1.71736 | ν 9 = 29.5 |
| r18 = 26.620 | d18 = 0.40 | | |
| r19 = 29.218 | d19 = 6.00 | n10 = 1.58313 | ν10 = 59.4 |
| *r20 = −42.587 | d20 = Variable | | |
| r21 = ∞ | | | |

*) Aspheric Surface

| Variable | Focal Length | | |
|---|---|---|---|
| Separation | 29.50 | 52.01 | 76.08 |
| d 6 | 37.70 | 11.30 | 0.86 |
| d12 | 2.34 | 8.93 | 15.51 |
| d16 | 15.00 | 8.42 | 1.84 |
| d20 | 0.00 | 10.49 | 20.98 |

Aspheric Coefficients:

| r20: | b = 7.335475e−06 | c = −2.472863e−08 |
|---|---|---|
| | d = 4.115772e−10 | e = −1.490244e−12 |

TABLE 1

| Condition | Limit | | Numerical Example | | | |
|---|---|---|---|---|---|---|
| No. & Factor | Lower | Upper | 1 | 2 | 3 | 4 |
| (4) |f3|/f2 | 1.5 | 2.5 | 1.6 | 1.6 | 1.7 | 1.8 |
| (5) f4/f2 | 2.1 | 10 | 3.5 | 3.5 | 2.4 | 3.0 |
| (6) OK4 | 0 | — | 1.9 | 2.0 | 0.8 | 1.2 |
| (7) |TS3t| | 1.1 | — | 1.9 | 1.8 | 1.2 | 1.3 |
| (8)* | 0.6 | 1.3 | 0.8 | 0.7 | 0.9 | 0.9 |
| (9)* | 1.3 | 3.5 | 1.8 | 1.7 | 1.8 | 1.7 |
| (10) |Δ23/Δ12| | 0.2 | 0.6 | 0.23 | 0.32 | 0.46 | 0.36 |

*(8): $|f1|/\sqrt{fW \cdot fT}$ (9): $f2 \cdot FNot/fT$

FIGS. 5A1 and 5A2, FIGS. 7A1 and 7A2, FIGS. 9A1 and 9A2 and FIGS. 11A1 and 11A2 are graphic representations of the aberrations of the variable magnification optical systems of the numerical examples 1 to 4, respectively, at image heights of y=0 and y=15 at the wide-angle end for the normal state. FIGS. 5B1 to 5B3, FIGS. 7B1 to 7B3, FIGS. 9B1 to 9B3 and FIGS. 11B1 to 11B3 are graphic representations of the aberrations of the variable magnification optical systems of the numerical examples 1 to 4, respectively, at image heights of y=0 and y=±15 at the wide-angle end during the image stabilizing operation for the tilting of 0.5° of the variable magnification optical system.

FIGS. 6A1 and 6A2, FIGS. 8A1 and 8A2, FIGS. 10A1 and 10A2 and FIGS. 12A1 and 12A2 are graphic representations of the aberrations of the variable magnification optical systems of the numerical examples 1 to 4, respectively, at image heights of y=0 and y=15 at the telephoto end for the normal state. FIGS. 6B1 to 6B3, FIGS. 8B1 to 8B3, FIGS. 10B1 to 10B3 and FIGS. 12B1 to 12B3 are graphic representations of the aberrations of the variable magnification optical systems of the numerical examples 1 to 4, respectively, at image heights of y=0 and y=±15 at the telephoto end during the image stabilizing operation for the tilting of 0.5° of the variable magnification optical system.

Incidentally, in the normal state of the variable magnification optical system, the graphic representation of the aberrations of the variable magnification optical system obtained at an image height of −15 is symmetrical with the graphic representation of the aberrations of the variable magnification optical system obtained at an image height of +15. Therefore, only the graphic representations of the aberrations obtained at an image height of +15 are shown. In addition, the object distance is assumed to be the infinite distance.

As described above, a lens unit which constitutes a part of the variable magnification optical system and which is relatively small in size and light in weight is selected to be used for compensating for the shaking of an image by moving the in the directions perpendicular to the optical axis when the variable magnification optical system vibrates (or tilts), and the proper rules of design are set forth for the construction and arrangement of the constituent lenses of the variable magnification optical system. This produces great advantages of improving the compact form of the entire optical system, simplifying the structure of the operating mechanism, and reducing the load on the driving means, while, when the image-stabilizing lens unit is made to decenter, still permitting the produced amount of decentering aberrations to be suppressed to a minimum. Accordingly, a variable magnification optical system whose range is about 3 with a field angle of about 73° at the wide-angle end and which is corrected well for the decentering aberrations is thus achieved.

Next, a practical example of application of the variable magnification optical system shown in each of the numerical examples 1 to 4 described above to a camera is described with reference to FIG. 13.

Figure 13:
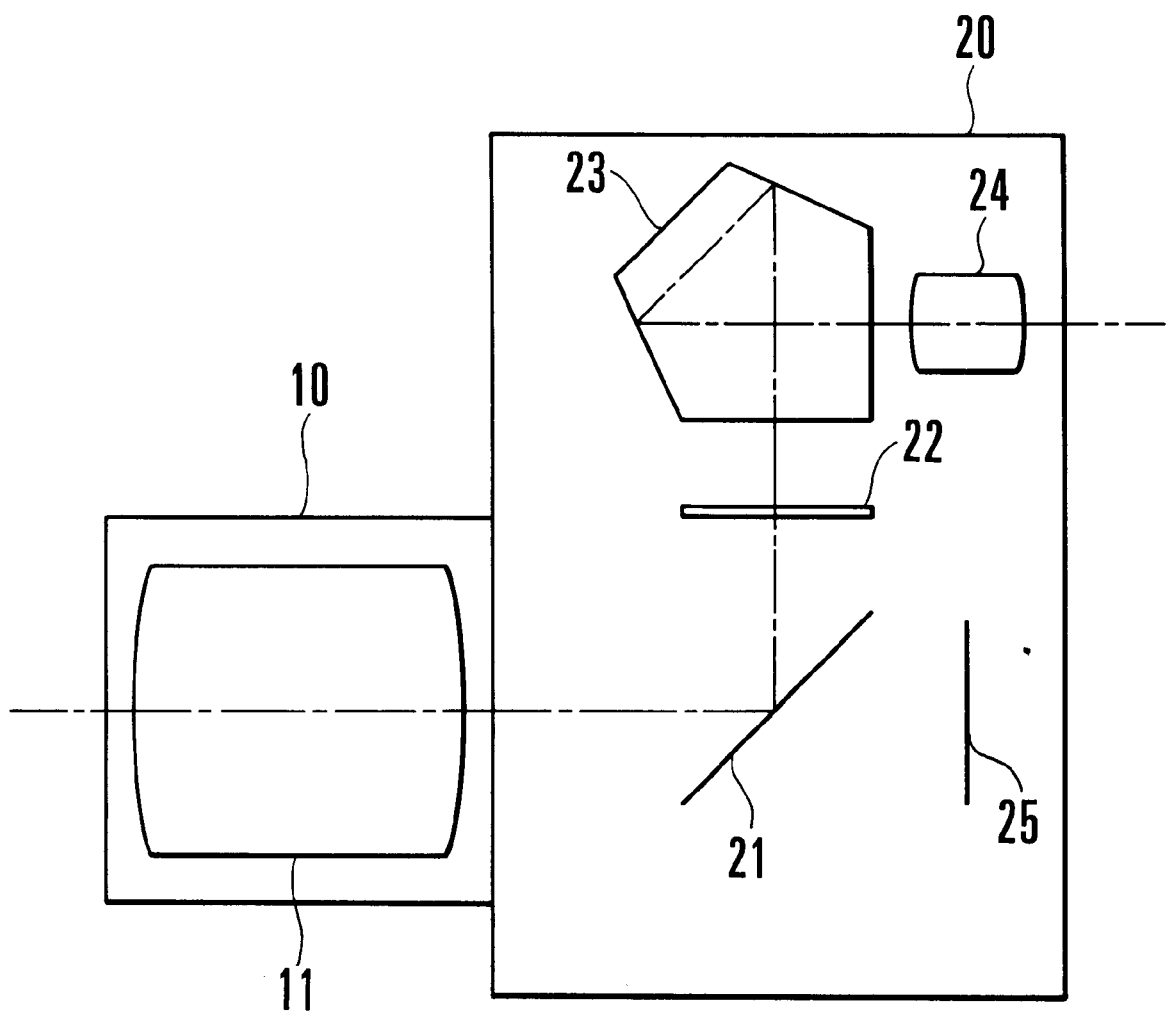
FIG. 13 is a schematic diagram of the main parts of a camera with the variable magnification optical system of any one of the numerical examples 1 to 4 applied to the photographic lens thereof.

In FIG. 13, the variable magnification optical system 11 of any one of the numerical examples 1 to 4 is housed in lens barrel 10. A camera body 20 contains a quick-return mirror 21 in the viewing position where a light beam entering through the variable magnification optical system 11 is reflected upward to a focusing screen 22 on which an image of an object being photographed is formed. The inverted image on the focusing screen 22 is erected and laterally reversed by a pentagonal roof prism 23. The object image formed on the focusing screen 22 is viewed through an eyepiece lens 24. During shooting, the mirror 21 is retracted from the optical path in response to the operation of a release button (not shown) by the photographer, so that the object image is cast on a silver-halide film 25.

With the variable magnification optical system of each of the numerical examples 1 to 4 applied to the above camera, a photographed image can be prevented as far as possible from being deteriorated by the vibration of the variable magnification optical system during shooting.

What is claimed is:

1. A variable magnification optical system comprising, in order from an object side to an image side;

a first lens unit of negative refractive power;

a second lens unit of positive refractive power;

a third lens unit of negative refractive power; and a fourth lens unit of positive refractive power, wherein the separation between every successive two of said first to fourth lens units is varied to effect variation of magnification, wherein said third lens unit is so moved as to have directional components perpendicular to an optical axis to compensate for shaking of an image caused by vibration of said variable magnification optical system, wherein said third lens unit moves along the optical axis during variation of magnification, wherein said variable magnification optical system satisfies the following conditions:

$$D1W>D1T$$

$$D2W<D2T$$

$$D3W>D3T$$

$$1.5<|f3|/f2<2.5$$

$$2.1<f4/f2<10$$

where DiW and DiT are separations between the i-th lens unit and the (i+1)st lens unit at a wide-angle end and at a telephoto end, respectively, and fi is the focal length of the i-th lens unit, wherein said system further comprises an aperture stop disposed on the object side or the image side of said third lens unit, which remains stationary when said third lens unit is moved to compensate for shaking of an image and which integrally moves with said third lens unit during variation of magnification, wherein said third lens unit consists of a positive lens and a negative lens, and said fourth lens unit includes a negative lens and a positive lens, and wherein said first lens unit moves in a locus convex to the image side during variation of magnification from the wide-angle end to the telephoto end.

2. A variable magnification optical system according to claim 1, further satisfying the following condition:

$$0<OK4$$

where OK4 is a distance from a most image side surface of said fourth lens unit to a rear principal point of said fourth lens unit.

3. A variable magnification optical system according to claim 1, wherein said fourth lens unit has at least one aspheric surface.

4. A variable magnification optical system according to claim 1, wherein said second lens unit and said fourth lens unit move integrally with each other during variation of magnification.

5. A variable magnification optical system according to claim 1, wherein said first lens unit consists of, in order from the object side to the image side, a negative lens of meniscus form concave toward the image side, a negative lens having a concave surface facing the image side and a positive lens of meniscus form convex toward the object side, said second lens unit consists of, in order from the object side to the image side, a negative lens of meniscus form concave toward the image side, a positive lens of bi-convex form and a positive lens having a convex surface facing the object side, said third lens unit consists of, in order from the object side to the image side, a positive lens of meniscus form convex toward the image side and a negative lens of bi-concave form, and said fourth lens unit consists of, in order from the object side to the image side, a negative lens of meniscus form concave toward the image side and a positive lens of bi-convex form.

6. A variable magnification optical system according to claim 1, further satisfying the following conditions:

$$1.1 < |TS3t|$$

$$0.6 < |f1|/\sqrt{fW \cdot fT} < 1.3$$

$$1.3 < f2 \cdot FNot/fT < 3.5$$

$$0.2 < |\Delta23/\Delta12| < 0.6$$

wherein TS3t is a sensitivity to parallel decentering of said third lens unit in the telephoto end, fW and fT are focal lengths in the wide-angle end and the telephoto end of said variable magnification optical system, respectively, FNot is an F-number in the telephoto end of said variable magnification optical system, and $\Delta12$ and $\Delta23$ are amounts of variation of separations between said first lens unit and said second lens unit and between said second lens unit and said third lens unit, respectively, during variation of magnification from the wide-angle end to the telephoto end.

7. An optical apparatus comprising:

a variable magnification optical system according to any of claims 1,2,3,4,5 and 6.

* * * * *